May 15, 1962
P. E. CAMPBELL
3,034,800
SLED OR TOBOGGAN
Filed Feb. 16, 1959
2 Sheets-Sheet 1
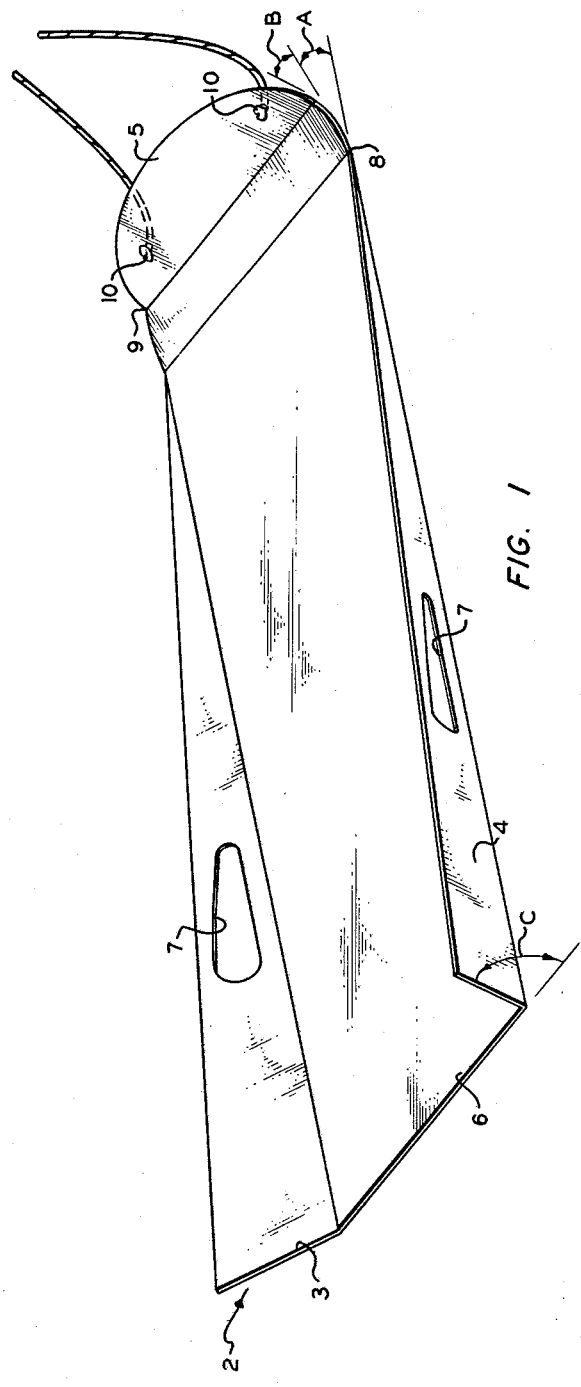
INVENTOR.
P.E. CAMPBELL
BY
Hudson and Young
ATTORNEYS

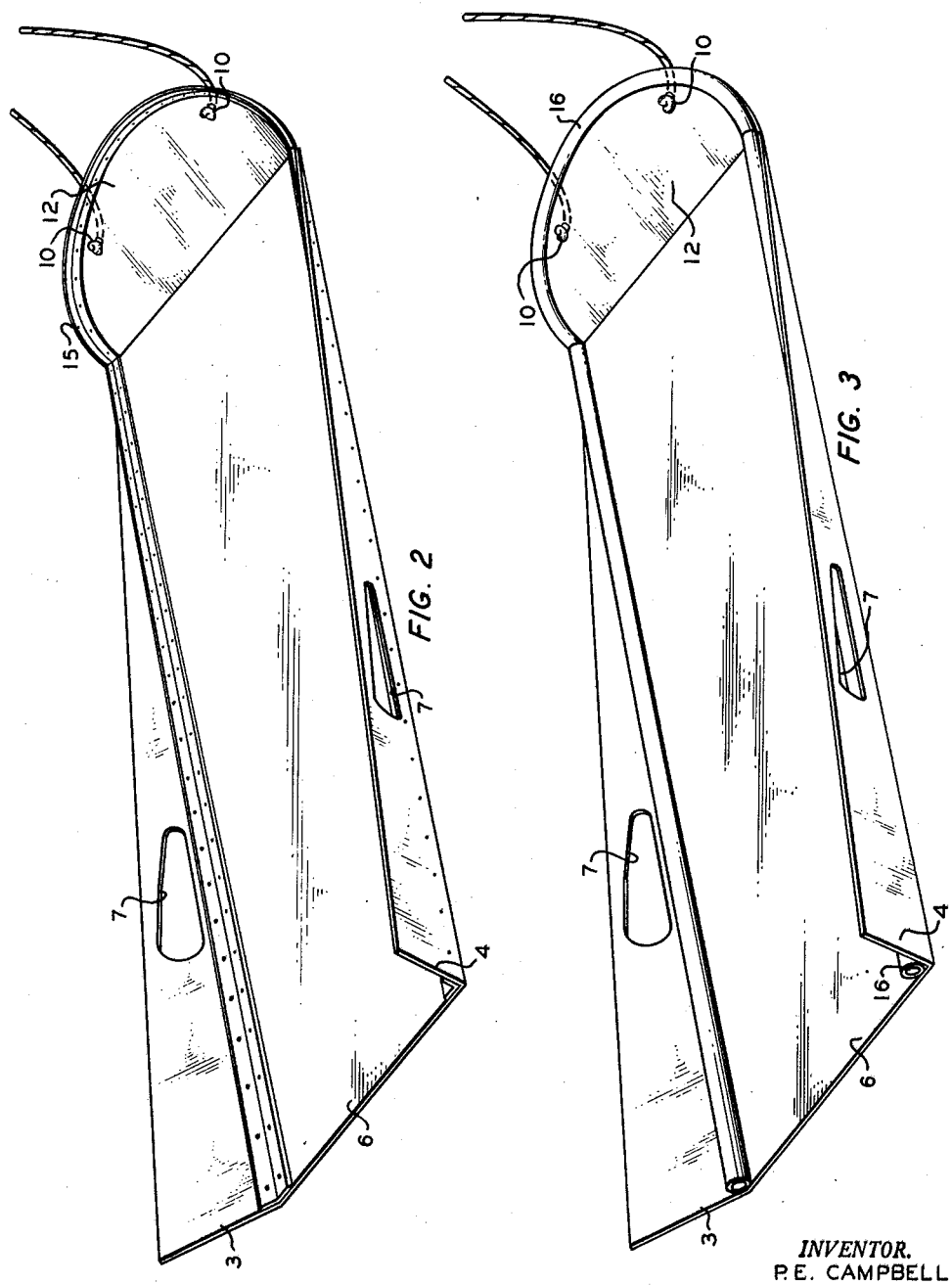

United States Patent Office 3,034,800
Patented May 15, 1962

3,034,800
SLED OR TOBOGGAN
Paul E. Campbell, Bartlesville, Okla., assignor to Phillips Petroleum Company, a corporation of Delaware
Filed Feb. 16, 1959, Ser. No. 793,310
2 Claims. (Cl. 280—18)

This invention relates to a sled or toboggan of improved construction. In one aspect, the invention relates to a sled or toboggan fabricated from a material unexpectedly suitable for this purpose.

It is known in the art to make sleds and toboggans from wood and from plastics. Sleds having metal runners have the disadvantage of requiring fairly deep snow for operation. Sleds or toboggans made of plastics have in the past been rather unsuccessful because many of the plastics utilized for this purpose become brittle at low temperatures and do not retain high impact strengths. Others lack rigidity. Still others have a relatively high coefficient of friction.

An object of the present invention is to provide a sled having improved structure. Another object is to provide a sled or toboggan made of a plastic material having unexpectedly desirable properties for this purpose. A further object is to simplify the fabrication of a plastic sled or toboggan. Still another object is to provide a sled or toboggan which will operate with little or no snow. Additional objects and advantages will become apparent to one skilled in the art from a study of this disclosure. According to my invention, a sled or toboggan is constructed of a normally solid polymer of ethylene, said polymer having a density of at least 0.940 gram per cubic centimeter at approximately 77° F. and a molecular weight, based on viscosity measurement, of at least 35,000.

FIGURE 1 of the drawings is a perspective view of a sled or toboggan illustrating one of the simpler forms of my invention.

FIGURE 2 is a perspective view of a sled or toboggan in accordance with a modified form of my invention.

FIGURE 3 is a perspective view of a sled or toboggan in accordance with still another form of my invention.

FIGURE 1 illustrates a sled or toboggan made from a single flat sheet of polyethylene, designated generally by the numeral 2, in accordance with my invention. A single flat polyethylene sheet otherwise having the general configuration shown in FIGURE 1 can be bent, as shown in FIGURE 1, by the use of a heated wire which is brought into contact or near contact with the polyethylene sheet along the bends shown. An electric current can be passed through the wire to heat the same and cause the sheet to soften along the bend lines. The areas indicated generally by numerals 3, 4, and 5 can then be bent to obtain the sled configuration shown in FIGURE 1. The bending can be effected by the use of gravity or by the use of other applied force to aid in the bending of the sheet. Numerals 3 and 4 indicate side rails which can be produced by the heated-wire technique. The numeral 5 indicates a front-end member. The numeral 6 indicates the resulting flat bottom of the sled which remains after the bending of members 3, 4, and 5. Numeral 7 indicates hand grips in the side rails 3 and 4. These can be produced by any suitable method for drilling or perforating the side rails to provide apertures. Thus the hand grips 7 can be made by means of a keyhole saw or compass saw or can be punched with a piece of metal. Alternatively, any other suitable cutting instrument can be utilized. If a saw or other cutting instrument is utilized to produce the hand grips it is generally desirable to smooth the edges and internal surfaces of the hand grips by means of heat or an abrasive. The upturned front-end member 5 can be produced by single bend as shown in FIGURES 2 and 3 or can be produced by two or more bends, e.g. along lines 8 and 9, as illustrated in FIGURE 1. In the modification shown in FIGURE 1, each of the angles A and B can be, for example, of the order of 10 to 30°. Holes 10 can be drilled in upturned front end member 5 for attachment of a pulling rope. Angle C can be, for example, within the range 45 to 80°. However, other values of angle C can be used, for example 90°.

The embodiments of my invention shown in FIGURES 2 and 3, although illustrated as being made from a single sheet of polyethylene, can be made of three pieces of polyethylene sheet, the side rails 3 and 4 being cut from separate sheets of polyethylene from that used to produce the bottom member 6. The upturned front end member 12 can be produced by hot-wire bending, as discussed in connection with FIGURE 1. Also, in FIGURE 2, there is illustrated a strengthening member 15 made of metal, e.g. angle iron or aluminum. Initially, the strengthening member can have the general configuration of a horseshoe or a U and is bent upward at the forward end to conform to front-end member 12. By means of suitable holes and bolts, rivets, screws, or brads, or by welding, the side members 3 and 4 can be attached to the strengthening member 15, which is also attached to bottom member 6.

The structure in FIGURE 3 is similar to that in FIGURES 1 and 2. Numeral 16 designates a tubular strengthening member which can be utilized in one-piece or three-piece construction as described in connection with FIGURE 2. Tube 16 can be made of any desired metal, such as aluminum, or of the same polyethylene of which the remainder of the sled is constructed.

Polyethylenes suitable for the fabrication of sleds or toboggans according to the present invention are commercially available in large quantities. Methods for preparing and fabricating such polyethylenes are now known to those skilled in the art. One suitable preparation method is disclosed in United States Patent 2,825,721 (1958). As previously indicated, the polyethylene utilized in accordance with the present invention has a density of at least 0.940 gram per cc. at 73–78° F. and a molecular weight of at least 35,000. This classification includes, in addition to homopolymers of ethylene, copolymers of ethylene with higher monoolefins and diolefins, e.g. propylene and 1-butene, the higher comonomer generally being incorporated into the copolymer molecule in small proportions as compared with the ethylene. Any desired amount of the comonomer can be utilized to form the copolymer so long as the density is at least 0.940 gram per cc. Preferably, the polyethylene utilized has a density in the range 0.950 to 0.963 gram per cc. and a molecular weight in the range 35,000 to 250,000.

Polyethylenes having the characteristics disclosed hereinbefore, generally have a flexural modulus (determined at 73° F. in accordance with ASTM Method D 790–49T) of at least 100,000, and usually within the range 160,000 to 240,000, p.s.i. These polyethylenes also have a brittleness temperature (determined according to ASTM Method D 746–55T) not greater than −20° F. and generally from −100 to below −180° F. These properties appear to explain, in part, the great suitability of the disclosed polyethylene for use in fabricating sleds and toboggans in accordance with my invention.

Another property of this type polyethylene which appears to explain partially the suitability for the purposes of this invention is the fact that the impact strength of the polyethylene remains at a desirably high value even at very low temperatures, varying relatively slightly over a broad temperature range. Izod impact strength is measured in accordance with the ASTM Method D 256–54T, utilizing a ¼-inch bar of the tested plastic. One polyethylene which is illustrative of polyethylenes suitable for the purposes of the present invention has a density of approximately 0.960, a molecular weight of about 40,000, a melt index (ASTM Method D–1238–52T) of 0.7 and an Izod impact strength at 70° F. of approximately 3.0 foot-pounds per inch notch. The impact strength at 0° F. of this polyethylene is 2.0, and the impact strength at −100° F. is 1.0 foot-pound per inch notch.

Another property of the polyethylenes specified herein is that they have exceedingly low coefficients of friction as compared with other plastics. The numerical magnitude of the coefficient of friction of a particular material will depend upon the particular method of measurement used, as well as the material against which the tested material is contacted in measuring the coefficient of friction. Thus, in one method of measuring the coefficient of friction, involving rubbing a ½-inch diameter moving ball of the tested material against three stationary balls or disks of the plastics to be tested, in the absence of added lubricant, nylon (a polyamide resin) had a coefficient of friction of 0.550 at a 10-kilogram load and 0.218 at a 40-kilogram load, Teflon (a solid polymer of tetrafluoroethylene) had a coefficient of friction of 0.246 at a 10-kilogram load and a coefficient of friction of 0.046 at a 40-kilogram load, and a 0.960-density polyethylene having a molecular weight of 40,000 had a coefficient of friction of 0.100 at a 10-kilogram load and a coefficient of friction of 0.016 at a 40-kilogram load. This test procedure ("Friction and Wear") is more fully disclosed in a pamphlet entitled "Lubricants Test Illustrations," May 1, 1953, United States Steel Lubricants Testing Laboratory, National Tube Division, 327 Craft Avenue, Pittsburgh 13, Pennsylvania. In another method of measuring coefficient of friction wherein a block of the plastic to be tested is allowed to slide down a steel inclined plane at several different angles and the tangent of the angle at which a predetermined sliding speed is obtained is determined, a general purpose polystyrene had a coefficient of friction of 0.33, nylon had a coefficient of friction of 0.30, high-pressure polyethylene having a density of approximately 0.92 gram per cc. had a coefficient of friction of 0.40, and a polyethylene according to the present invention, having a density of 0.960 and a molecular weight of 40,000, had a coefficient of friction of 0.28.

A sled fabricated from polyethylene having a density of 0.960, a melt index of 0.9, an Izod impact strength of 4.0 foot-pounds per inch notch and a molecular weight of approximately 40,000 was fabricated in accordance with FIGURE 1 except that the front end member 5 was constructed of a single bend as illustrated by member 12 in FIGURE 2. The flat bottom member 6 was 36 inches long and 14 inches wide, the front end member 12 was semicircular and had a radius of 7 inches and the side rails 3 and 4 were 5 inches broad at their maximum dimensions. The side rails were bent upward at an angle substantially as illustrated in FIGURE 1. This sled was fabricated by the hot-wire technique already described herein. The entire sled was fabricated from a single 125-mil sheet of polyethylene. This sled weighed 2⅞ pounds. It slides well on snow (even in depths less than 1 inch), on weeds and on sand and can be used on water as a surf board.

The term "density," as used herein, and in the claims, is intended to signify density determined in the following manner:

The sample is prepared by compression molding of the polyethylene at a temperature of 340° F. in a mold provided with a water jacket through which water can be circulated. The sample is maintained at about 340° F. until it is completely molten. It is then cooled from 340 to 200° F. at the rate of approximately 10 Fahrenheit degrees per minute. Water is then circulated through the mold to continue the cooling to 150° F., the rate not exceeding 20 Fahrenheit degrees per minute. The polyethylene is then removed from the mold and cooled to room temperature. A small piece of the solidified polyethylene is cut from the compression molded sample and inspected to make sure that it is free of voids and that it has a sufficiently smooth surface to prevent the trapping of air bubbles thereon. The small sample is placed in a 50-ml. glass-stoppered graduate. Carbon tetrachloride and methylcyclohexane are then allowed to run into the graduate from separate burettes in such proportions that the sample is suspended in the mixed solution, i.e. it neither floats nor sinks. The graduate is shaken during the addition of liquid in order that the two liquids mix thoroughly. A total liquid volume of 15 to 20 ml. is required. After the liquids have been so proportioned that the polyethylene is suspended therein without sinking or floating, the density of the liquid mixture is equal to the density of the solid polyethylene. The polyethylene is then removed from the liquid and a portion of the liquid mixture of carbon tetrachloride and methylcyclohexane is transferred to a Westphal balance and the specific gravity of the liquid is measured at a temperature in the range 73 to 78° F. This specific gravity is equal to the specific gravity of the polyethylene. For most practical purposes, the specific gravity can be considered identical to the density. However, if a precise conversion to actual density units (grams per cc.) is desired, this is readily referable to water at 4° C. by calculations which will readily be evident to those skilled in the art. The precision of a single specific gravity determination is ordinarily within ±.0002.

The term "molecular weight" as used in the present disclosure and claim is determined as follows:

The molecular weight determination is based upon a measurement of the intrinsic viscosity of the polyethylene. The intrinsic viscosity is determined by measuring the time required for a filtered solution of 0.1000 gram of the polyethylene in 50 ml. of tetralin (measured at room temperature, i.e., about 75° F.) to run through the marked length on a size 50 (0.8–3.0 centistokes) Ostwald-Fenske viscosimeter at a temperature of 130° C. (the viscosimeter being immersed in a thermostatically controlled oil bath) and measuring also the time required for an equal volume of tetralin containing no polyethylene to run through the same distance on the same viscosimeter. The molecular weight is calculated in accordance with the following formula:

$$M_w = \frac{K 2.303 \log Vr}{C}$$

where $K = 24,450$
$C = 0.183$
$Vr$ = time, in seconds, required for solution to run through viscosimeter divided by the corresponding time required for the polymer-free tetralin, both at 130° C.

A single determination of molecular weight ordinarily has a precision of ±1000 molecular weight units.

While certain examples and structures have been specifically described herein for purposes of illustration, the invention is not limited thereto. Variation and modification within the scope of the disclosure and claims will become apparent to those skilled in the art on consideration of this disclosure.

I claim:

1. A sled or toboggan having a flat bottom member upturned at the forward end thereof, a stiffening member conforming to and attached to the peripheral part of said member at the sides and forward portion thereof, and side rails integral with said bottom member and attached to said stiffening member along the junction between said side rails and said bottom, said bottom member, said stiffening member, and said side rails being fabricated from polyethylene having a density in the range 0.950 to 0.963 gram per cubic centimeter and a molecular weight in the range 35,000 to 250,000.

2. A sled or toboggan according to claim 1 wherein said stiffening member is tubular.

References Cited in the file of this patent

UNITED STATES PATENTS

| | | |
|---|---|---|
| 359,741 | Pusey | Mar. 22, 1887 |
| 411,255 | Newburg | Sept. 17, 1889 |
| 1,103,622 | O'Shaughnessy | July 14, 1914 |
| 2,132,744 | McCraw | Oct. 11, 1938 |
| 2,219,905 | Prickman | Oct. 29, 1940 |
| 2,614,857 | Mathisen | Oct. 21, 1952 |
| 2,762,063 | Quinn | Sept. 11, 1956 |
| 2,825,721 | Hogan et al. | Mar. 4, 1958 |

FOREIGN PATENTS

| | | |
|---|---|---|
| 80,599 | Sweden | June 5, 1934 |
| 631,879 | Great Britain | Nov. 11, 1949 |